United States Patent
Mimura

(10) Patent No.: US 6,802,616 B2
(45) Date of Patent: Oct. 12, 2004

(54) TRIANGULAR PYRAMID TYPE CUBE-CORNER RETROREFLECTIVE ELEMENT

(75) Inventor: Ikuo Mimura, Uozu (JP)

(73) Assignee: Nippon Carbide Kogyo Kabushiki Kaisha, Tokyo (JP)

(*) Notice: Subject to any disclaimer, the term of this patent is extended or adjusted under 35 U.S.C. 154(b) by 132 days.

(21) Appl. No.: 10/149,769

(22) PCT Filed: Dec. 6, 2000

(86) PCT No.: PCT/JP00/08621

§ 371 (c)(1),
(2), (4) Date: Jun. 13, 2002

(87) PCT Pub. No.: WO01/42822

PCT Pub. Date: Jun. 14, 2001

(65) Prior Publication Data

US 2002/0191292 A1 Dec. 19, 2002

(30) Foreign Application Priority Data

Dec. 13, 1999 (JP) .......................................... 11-353144

(51) Int. Cl.⁷ .............................................. G02B 5/124
(52) U.S. Cl. ...................................... 359/530; 359/529
(58) Field of Search ................................. 359/529, 530, 359/546; 428/141, 156, 167

(56) References Cited

U.S. PATENT DOCUMENTS

| | | | |
|---|---|---|---|
| 2,310,790 A | 2/1943 | Jungersen | 88/105 |
| 2,380,447 A | 7/1945 | Jungersen | 88/78 |
| 2,481,757 A | 9/1949 | Jungersen | |
| 3,190,178 A | 6/1965 | McKenzie | |
| 3,712,706 A | 1/1973 | Stamm | 350/103 |
| 3,830,682 A | 8/1974 | Rowland | 161/2 |
| 4,025,159 A | 5/1977 | McGrath | 350/105 |
| RE29,396 E | 9/1977 | Heenan | 204/281 |
| 4,243,618 A | 1/1981 | Van Arnam | 264/1 |
| 4,349,598 A | 9/1982 | White | 428/161 |
| 4,498,733 A | 2/1985 | Flanagan | 350/102 |
| 4,588,258 A | 5/1986 | Hoopman | 350/103 |
| 4,775,219 A | 10/1988 | Appeldorn et al. | 350/103 |
| 4,801,193 A | 1/1989 | Martin | 350/103 |
| 4,897,136 A | 1/1990 | Bailey et al. | 156/145 |
| 5,064,272 A | 11/1991 | Bailey et al. | 359/541 |

(List continued on next page.)

FOREIGN PATENT DOCUMENTS

| | | |
|---|---|---|
| EP | 0 137 736 | 4/1985 |
| EP | 0 175 031 | 3/1986 |
| EP | 0 548 280 | 6/1993 |

(List continued on next page.)

Primary Examiner—Euncha Cherry
(74) Attorney, Agent, or Firm—Fitzpatrick, Cella, Harper & Scinto

(57) ABSTRACT

To provide a retroreflective sheeting not only superior in high-brightness characteristic which is a basic optical characteristic generally requested for a triangular-pyramidal reflective element, that is, reflectivity represented by the reflectivity of the light incoming from the front of the triangular-pyramidal reflective element but also whose entrance angularity and rotation angularity are greatly improved. A pair of triangular-pyramidal cube-corner retroreflective elements characterized in that the optical axis of the triangular-pyramidal reflective element pair tilts so that the angle formed between the optical axis and a vertical line extended from apexes (H1 and H2) of the elements to a bottom plane ($S_x$–$S_x'$) ranges between 0.5 and 1.5° in the direction in which the difference (q–p) between the distance (q) from the intersection (Q) of the optical axis and the bottom plane ($S_x$–$S_x'$) up to base edges (x,x, . . . ) shared by the element pair and the distance from the intersection (P) of the vertical line and the bottom plane ($S_x$–$S_x'$) up to the base edges (x,x, . . . ) shared by the element pair becomes plus (+) or minus (−).

11 Claims, 7 Drawing Sheets

U.S. PATENT DOCUMENTS

| | | | |
|---|---|---|---|
| 5,122,902 A | 6/1992 | Benson | 359/529 |
| 5,138,488 A | 8/1992 | Szczech | 359/529 |
| 5,264,063 A | 11/1993 | Martin | 156/247 |
| 5,376,431 A | 12/1994 | Rowland | 428/164 |
| 5,557,836 A | 9/1996 | Smith et al. | 29/527.4 |
| 5,564,870 A | 10/1996 | Benson et al. | 409/131 |
| 5,600,484 A | 2/1997 | Benson et al. | 359/529 |
| 5,696,627 A | 12/1997 | Benson et al. | 359/529 |
| 5,706,132 A | 1/1998 | Nestegard et al. | 359/529 |
| 5,721,640 A | 2/1998 | Smith et al. | 359/530 |
| 5,764,413 A | 6/1998 | Smith et al. | 359/530 |
| 5,831,767 A | 11/1998 | Benson et al. | 359/529 |
| 5,840,405 A | 11/1998 | Shusta et al. | 428/156 |
| 5,840,406 A | 11/1998 | Nilsen | 428/156 |
| 5,844,712 A | 12/1998 | Caroli | 359/529 |
| 5,854,709 A | 12/1998 | Couzin | 359/529 |
| 5,889,615 A | 3/1999 | Dreyer | 359/529 |
| 5,898,523 A | 4/1999 | Smith et al. | 359/530 |
| 5,914,812 A | 6/1999 | Benson et al. | 359/529 |
| 5,981,032 A | 11/1999 | Smith et al. | 428/167 |
| 5,988,820 A | 11/1999 | Huang et al. | 359/530 |
| 6,036,322 A | 3/2000 | Nilsen et al. | 359/529 |
| 6,083,607 A * | 7/2000 | Mimura et al. | 428/167 |
| 6,120,280 A | 9/2000 | Mimura et al. | 425/195 |
| 6,155,689 A | 12/2000 | Smith | 359/530 |
| 6,206,525 B1 | 3/2001 | Rowland et al. | 359/530 |
| 6,390,629 B1 | 5/2002 | Mimura et al. | 359/530 |

FOREIGN PATENT DOCUMENTS

| | | |
|---|---|---|
| EP | 96/10197 | 4/1996 |
| EP | 0 887 665 | 12/1998 |
| EP | 1 081 511 | 3/2001 |
| EP | 0 830 621 | 11/2001 |
| EP | 1 164 390 | 12/2001 |
| GB | 441319 | 12/1933 |
| JP | 63-143502 | 6/1988 |
| JP | 11-305017 | 11/1999 |
| WO | 92/04647 | 3/1992 |
| WO | WO 95/14091 | 6/1994 |
| WO | WO 95/11463 | 4/1995 |
| WO | WO 95/11465 | 4/1995 |
| WO | WO 95/11470 | 4/1995 |

* cited by examiner

A

B

A

B

A

B

TRIANGULAR PYRAMID TYPE CUBE-CORNER RETROREFLECTIVE ELEMENT

TECHNICAL FIELD

The present invention relates to a triangular-pyramidal cube-corner retroreflective sheeting having a novel structure. More minutely, the present invention relates to a retroreflective element such as a triangular-pyramidal cube-corner retroreflective element (hereafter merely referred to as a retroreflective element or a reflective element) constituting a retroreflective body useful for reflectors such as signs including traffic signs and construction work signs, license plates of vehicles such as automobiles and motorcycles, safety materials of clothing and life preservers, markings of signboards, and reflectors of visible-light, laser beams, or infrared-ray reflective sensors, and an assembly of the retroreflective elements.

BACKGROUND ART

A retroreflective body for reflecting entrance light toward a light source has been well known so far and the reflective body using its retroreflectivity is widely used in the above industrial fields. Particularly, a triangular-pyramidal cube-corner retroreflective body (hereafter also referred to as a CC reflective body) using the internal-total-reflection theory such as a triangular-pyramidal cube-corner retroreflective element (hereafter also merely referred to as a triangular-pyramidal reflective element or CC reflective element) is remarkably superior to a retroreflective body using conventional micro glass beads in retroreflective efficiency of light and thereby, purposes of the triangular-pyramidal cube-corner retroreflective element have been increased year by year because of its superior retroreflective performance.

However, though a conventional publicly-known triangular-pyramidal retroreflective element shows a preferable retroreflective efficiency when an angle formed between the optical axis (axis passing through the apex of a triangle equally separate from three faces constituting a triangular-pyramidal cube-corner retroreflective element and intersecting with each other at an angle of 90°) of the element and an entrance ray is small because of the reflection theory of the element, the retroreflective efficiency is suddenly lowered (that is, the entrance angle characteristic is deteriorated) as the entrance angle increases. Moreover, the light entering the face of the triangular-pyramidal reflective element at an angle less than the critical angle ($\alpha_c$) meeting an internal-total-reflection condition decided in accordance with the refractive index of a transparent medium constituting the triangular-pyramidal reflective element and that of air reaches the back of the element without totally reflecting from the interface of the element. Therefore, a retroreflective sheeting using a triangular-pyramidal reflective element generally has a disadvantage that it is inferior in entrance angularity.

However, because a triangular-pyramidal retroreflective element can reflect light in the direction in which the light enters over the almost entire surface of the element, reflected light does not reflect by diverging at a wide angle due to spherical aberration like the case of a micro-glass-bead reflective element. However, the narrow divergent angle of the reflected light easily causes a trouble that when the light emitted from a head lamp of an automobile retroreflects from a traffic sign, it does not easily reach, for example, eyes of a driver present at a position separate from the optical axis of the head lamp. The above type of the trouble increases more and more (that is, observation angularity is deteriorated) because an angle (observation angle) formed between the entrance axis of rays and the axis connecting a driver with a reflection point increases.

Many proposals have been made so far for the above cube-corner retroreflective sheeting, particularly for a triangular-pyramidal cube-corner retroreflective sheeting and various improvements are studied.

For example, Jungersen's U.S. Pat. No. 2,310,790 discloses a retroreflective sheeting constituted by arranging various shapes of retroreflective elements on a thin sheeting and a method for manufacturing the sheeting. The triangular-pyramidal reflective elements disclosed in the above U.S. patent include a triangular-pyramidal reflective element in which the apex is located at the center of a bottom-plane triangle and the optical axis does not tilt (that is, the optical axis is vertical to the bottom plane) and a triangular-pyramidal reflective element in which the apex is not located at the center of a bottom-plane triangle, and it is described in the U.S. patent to efficiently reflect light to an approaching automobile. Moreover, it is described that the depth of a triangular-pyramidal reflective element is kept within 1/10 in (2,540 μm). Furthermore, FIG. 15 in the U.S. patent shows a triangular-pyramidal reflective element whose optical axis has a tilt angle (θ) of approx. 6.5° obtained from the ratio between the major side and the minor side of the bottom-plane triangle of the illustrated triangular-pyramidal reflective element.

However, the above Jungersen's U.S. patent does not specifically disclose a very-small triangular-pyramidal reflective element disclosed by the present invention or does not describe or suggest a size of a triangular-pyramidal reflective element or a tilt angle the optical axis of the element necessary for superior observation angularity and entrance angularity.

Moreover, in the present specification, the expression "optical axis tilts in the plus (+) direction" denotes that the optical axis tilts in the direction in which the difference between the distance (q) from the intersection (Q) of the optical axis of a triangular-pyramidal reflective element and the bottom plane ($S_x$–$S_x$') of the triangular-pyramidal reflective element up to the base edges (x,x, . . . ) shared by the element pair {the distance (q) is equal to the distance from the intersection (Q) up to a plane ($L_x$—$L_x$) vertical to the bottom plane ($S_x$–$S_x$') including the bottom edges (x,x, . . . ) shared by the element pair} and the distance (p) from the vertical line extended from the apex of the element to the bottom plane ($S_x$–$S_x$') and the bottom plane ($S_x$–$S_x$') up to the base edges (x,x, . . . . ) {the distance (p) is equal to the distance from the intersection (P) up to the vertical plane ($L_x$—$L_x$)} becomes plus (+) as described later. On the contrary, when the optical axis tilts in the direction in which (q–p) becomes minus (–), the expression "optical axis tilts in the direction for the optical axis to become minus (–)" is displayed.

Moreover, Stamm's U.S. Pat. No. 3,712,706 discloses a retroreflective sheeting in which the so-called triangular-pyramidal cube-corner retroreflective elements respectively having an equilateral bottom-plane triangle (therefore, the optical axis is vertical to a bottom plane) are arranged on a thin sheeting so that bottom planes of the elements become the closest-packed state on a common plane. In the Stamm's U.S. patent, means for improving the wide angularity in accordance with the tilt of an optical axis is not described at all.

Furthermore, Hoopman's European Patent No. 137, 736B1 discloses a retroreflective sheeting in which tilted triangular-pyramidal cube-corner retroreflective elements whose bottom-plane triangles are isosceles triangles are arranged on a common plane so that bottom planes of the elements become the closest-packed state. Moreover, it is described that the optical axis of the triangular-pyramidal cube-corner retroreflective element disclosed in the patent tilts in the minus (−) direction and its tilt angle approximately ranges between 7° and 13°.

Furthermore, Szczech's U.S. Pat. No. 5,138,488 similarly discloses a retroreflective sheeting in which tilted triangular-pyramidal cube-corner retroreflective elements whose bottom-plane triangles are isosceles triangles are arranged on a common plane so that bottom planes of the elements become the closest-packed state. In the U.S. patent, it is specified that the optical axis of a pair of the triangular-pyramidal reflective elements tilts in the direction of the side shared by the triangular-pyramidal reflective element pair faced each other and the tilt angle ranges between approx. 2° and 5° and each element has a size of 25 to 100 μm.

Moreover, in European Patent No. 548,280B1 corresponding to the above patent, it is described that an optical axis tilts so that the distance (p) between a plane including a side common to two elements which are paired and vertical to a common plan and the apex of an element is not equal to the distance (q) between a point for the optical axis of an element to intersect with the common plane and the vertical plane and the tilt angle ranges between 2° and 5° and the height of an element ranges between 25 and 100 μm.

As described above, in Szczech's European Patent No. 548,280B1, the tilt of an optical axis ranges between approx. 2° and 5° including both plus (+) and minus (−). However, embodiments of the above Szczech's U.S. patent and European patent only specifically disclose triangular-pyramidal reflective elements in which tilt angles of optical axes are −8.2°, −9.2°, and −4.3° and the height (h) of an element is 87.5 μm.

The triangular-pyramidal cube-corner retroreflective elements in the above-described conventionally publicly-known Jungersen's U.S. Pat. No. 2,310,790, Stamm's U.S. Pat. No. 3,712,706, Hoopman's European Patent No. 137,736B1, Szczech's U.S. Pat. No. 5,138,488, and European Patent No. 548,280B1 are common to each other in that bottom planes of many triangular-pyramidal reflective elements serving as cores of entrance and reflection of light are present on the same plane. Moreover, every retroreflective sheeting constituted by triangular-pyramidal reflective elements whose bottom planes are present on the same plane is inferior in entrance angularity, that is, it has a disadvantage that the retroreflectivity suddenly decreases when an entrance angle of light to the triangular-pyramidal reflective element increases.

In general, the following are requested for a triangular-pyramidal cube-corner retroreflective sheeting as basic optical characteristics: high brightness, that is, intensity (magnitude) of reflection brightness represented by the reflection brightness of the light entering from the front of the sheeting, wide angularity, and three performances such as observation angularity, entrance angularity, and rotation angularity about wide angularity.

As described above, every retroreflective sheeting constituted by conventionally publicly-known triangular-pyramidal cube-corner retroreflective elements has a low entrance angularity and its observation angularity can not be satisfied in general. However, the present inventor et al. recently find that it is possible to improve the entrance angularity of a retroreflective sheeting constituted by triangular-pyramidal reflective elements by making the depth (h') of the element from apexes ($H_1$ and $H_2$) of a face (face c) having one bottom side on the bottom plane (X–X') of the triangular-pyramidal reflective element {the depth is equal to the height of apexes ($H_1$ and $H_2$) from the bottom plane (X–X')} substantially larger than the depth (h) of a plane (virtual plane Z–Z') including base edges (z and w) of two faces (face a and face b) substantially perpendicularly crossing the face c of the triangular-pyramidal reflective element from the apex of the plane. The invention of the present inventor et al. is announced in the official gazette No. WO98/18028 internationally released on Apr. 30, 1998.

DISCLOSURE OF THE INVENTION

It is an object of the present invention to provide a triangular-pyramidal cube-corner retroreflective element (CC reflective element) whose entrance angularity and rotation angularity are particularly improved. According to the present invention, the above object and advantage can be achieved by triangular-pyramidal cube-corner retroreflective elements characterized in that the triangular-pyramidal cube-corner retroreflective elements protruded onto a common bottom plane ($S_x$–$S_x'$) share a base edge (x) on the bottom plane and are arranged on the bottom plane ($S_x$–$S_x'$) in the closest-packed state so as to be faced each other, the bottom plane ($S_x$–$S_x'$) is a common plane including many base edges (x,x, . . . ) shared by the triangular-pyramidal reflective elements, two faced triangular-pyramidal reflective elements include the shared base edges (x,x, . . . ) on the bottom plane ($S_x$–$S_x'$) and form a pair of substantially-same-shaped elements faced each other so as to be substantially symmetric to planes ($L_x$—$L_x$, $L_x$—$L_x$, . . . ) vertical to the bottom plane ($S_x$–$S_x'$), and the optical axis of the triangular-pyramidal reflective element pair tilts so that the angle formed between the optical axis and a vertical line extended from apexes ($H_1$ and $H_2$) of the elements to the bottom plane ($S_x$–$S_x'$) ranges between 0.5° and 1.5° in the direction in which the difference (q–p) between the distance (q) from the intersection (Q) of the optical axis and the bottom plane ($S_x$–$S_x'$) up to the base edges (x,x, . . . ) shared by the elements and the distance (p) from the intersection (P) of the vertical line and the bottom plane ($S_x$–$S_x'$) up to the base edges (x,x, . . . . ) shared by the element pair becomes plus (+) or minus (−).

In the case of the present invention, it is preferable to use a triangular-pyramidal cube-corner retroreflective element in which the optical axis via apexes ($H_1$ and $H_2$) of the above triangular-pyramidal reflective elements tilts by 0.6° to 1.4° from a vertical line extended from apexes ($H_1$ and $H_2$) of the above triangular-pyramidal reflective elements to the bottom plane ($S_x$–$S_x'$) in the direction for (q–p) to become plus (+) or minus (−).

In the case of the present invention, it is more preferable to use a triangular-pyramidal cube-corner retroreflective element in which the optical axis of the triangular-pyramidal reflective elements tilts by 0.6° to 1.4° in the direction in which the difference (q–p) between the distance (q) from the intersection (Q) of the optical axis and the bottom plane ($S_x$–$S_x'$) up to the base edges (x,x, . . . ) shared by the elements and the distance (p) from the intersection (P) of a vertical line extended from apexes ($H_1$ and $H_2$) of the elements to the bottom plane ($S_x$–$S_x'$) and the bottom plane ($S_x$–$S_x'$) up to the base edges (x,x, . . . ) shared by the elements becomes plus (+).

A still-more-preferable triangular-pyramidal cube-corner retroreflective element of the present invention is a triangular-pyramidal cube-corner retroreflective element in which $h_x$ is substantially larger than $h_y$ and $h_z$ when assuming the height from a bottom plane ($S_x$–$S_x'$) including base edges (x,x, . . . ) shared by two triangular-pyramidal reflective elements faced each other up to apexes ($H_1$ and $H_2$) of the triangular-pyramidal reflective elements as $h_x$, the height from a bottom plane ($S_y$–$S_y'$) including the other base edges (y,y, . . . ) of the triangular-pyramidal reflective elements up to apexes ($H_1$ and $H_2$) of the triangular-pyramidal reflective elements as $h_y$, and the height from a bottom plane ($S_z$–$S_z'$) including the still other base edges (z,z, . . . ) of the triangular-pyramidal reflective elements up to apexes ($H_1$ and $H_2$) of the triangular-pyramidal reflective elements as $h_z$.

A still-more-preferable triangular-pyramidal cube-corner retroreflective element of the present invention is a triangular-pyramidal cube-corner retroreflective element in which $h_y$ and $h_z$ are substantially equal to each other and $h_x$ is substantially larger than $h_y$ and $h_z$ when assuming the height from a bottom plane ($S_x$–$S_x'$) including base edges (x,x, . . . ) shared by two triangular-pyramidal reflective elements faced each other up to apexes ($H_1$ and $H_2$) of the triangular-pyramidal reflective elements as $h_x$, the height from a bottom plane ($S_y$–$S_y'$) including the other base edges (y,y, . . . ) of the triangular-pyramidal reflective elements up to apexes ($H_1$ and $H_2$) of the triangular-pyramidal reflective elements as by, and the height from a bottom plane ($S_z$–$S_z'$) including the still other base edges (z,z, . . . ) of the triangular-pyramidal reflective elements up to apexes ($H_1$ and $H_2$) of the triangular-pyramidal reflective elements as $h_z$.

A still-more-preferable triangular-pyramidal cube-corner retroreflective element of the present invention is a triangular-pyramidal cube-corner retroreflective element in which the optical axis of the triangular-pyramidal reflective elements tilts by 0.6° to 1.4° in the direction in which the difference (q–p) between the distance (q) from the intersection (Q) of the optical axis and the bottom plane ($S_x$–$S_x'$) up to the base edges (x,x, . . . ) shared by the element pair and the distance (p) from the intersection (P) of a vertical line extended from apexes ($H_1$ and $H_2$) of the elements to the bottom plane ($S_x$–$S_x'$) and the bottom plane ($S_x$–$S_x'$) up to the base edges (x,x, . . . . ) shared by the elements becomes minus (–) and moreover, $h_y$ and $h_z$ are substantially equal to each other and $h_x$ is substantially smaller than $h_y$ and $h_z$ when assuming the height from a bottom plane ($S_x$–$S_x'$) including base edges (x,x, . . . ) shared by two triangular-pyramidal reflective elements faced each other up to apexes ($H_1$ and $H_2$) of the triangular-pyramidal reflective elements as $h_x$, the height from a bottom plane ($S_y$–$S_y'$) including the other base edges (y,y, . . . ) of the triangular-pyramidal reflective elements up to apexes ($H_1$ and $H_2$) of the triangular-pyramidal reflective elements as $h_y$, and the height from a bottom plane ($S_z$–$S_z'$) including the still other base edges (z,z, . . . ) of the triangular-pyramidal reflective elements up to apexes ($H_1$ and $H_2$) of the triangular-pyramidal reflective elements as $h_z$.

A still-more-preferable triangular-pyramidal cube-corner retroreflective element of the present invention is a triangular-pyramidal cube-corner retroreflective element in which an inequality "$1.03 < h_{max}/h_{min} < 1.3$" is satisfied when at least two of the above $h_x$, $h_y$, and $h_z$ are substantially different from each other and the maximum one of the $h_x$, $h_y$, and h, is assumed as $h_{max}$ and the minimum one of them is assumes as $h_{min}$.

A still-more-preferable triangular-pyramidal cube-corner retroreflective element of the present invention is a triangular-pyramidal cube-corner retroreflective element in which the above $h_x$, $h_y$, and $h_z$ respectively range between 50 and 500 μm (both included).

A still-more-preferable triangular-pyramidal cube-corner retroreflective element of the present invention is a triangular-pyramidal cube-corner retroreflective element in which the above $h_x$, $h_y$, and $h_z$ respectively range between 60 and 200 μm.

In the case of the present invention, a triangular-pyramidal cube-corner retroreflective element is preferable in which at least one prism-face angle formed when three lateral faces (faces $a_1$, $b_1$, and $c_1$) or (faces $a_2$, $b_2$, and $C_2$) of the triangular-pyramidal cube-corner retroreflective element cross each other ranges between 89.5° and 90.5° and is slightly deviated from 90.000°.

In the case of the present invention, a triangular-pyramidal cube-corner retroreflective element is more preferable in which the above triangular-pyramidal cube-corner retroreflective element is sheet-like.

The present invention is described below more minutely.

DETAILED DESCRIPTION OF THE INVENTION

Figure 1:
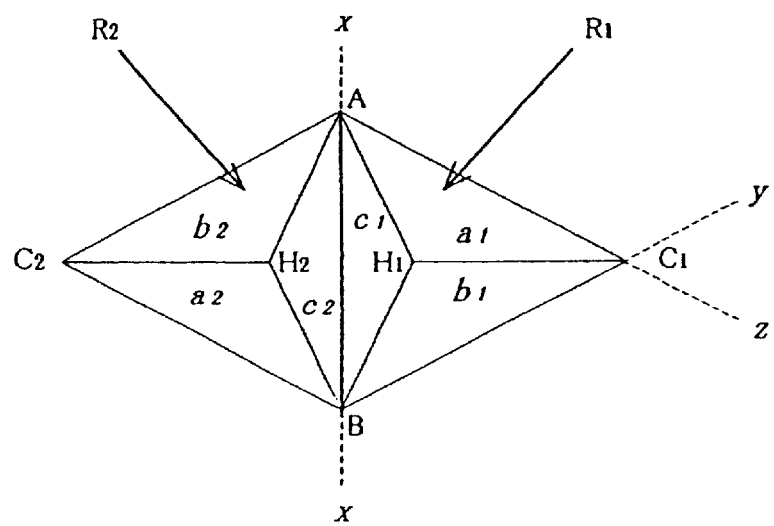
FIG. 1-A is a top view of a CC reflective element pair of the present invention in which base edges (x, y, and z) are present on the same bottom plane and the optical axis tilts in the direction for the optical axis to become plus (+) and FIG. 1-B is a sectional view of the CC reflective element pair.
Figure 1:
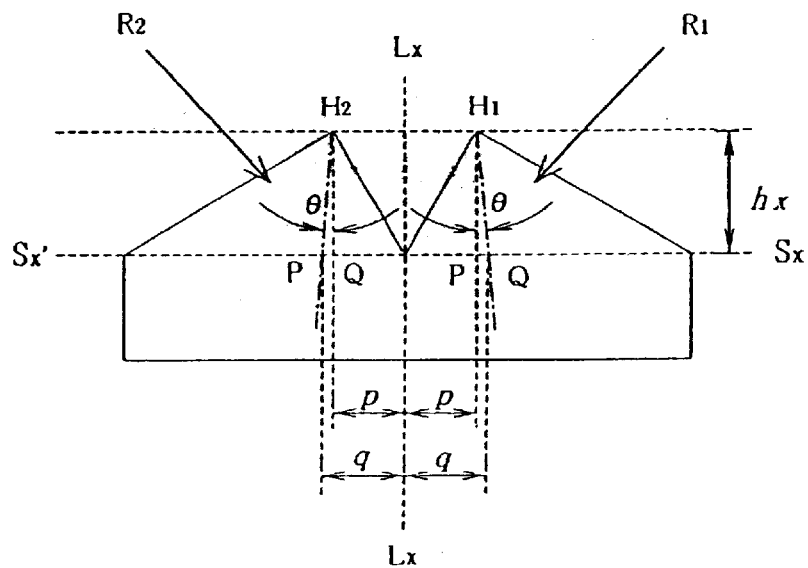

FIGS. 1-A and 1-B show a mode of a pair of triangular-pyramidal cube-corner retroreflective elements (CC reflective elements) R1 and R2 of the present invention, in which FIG. 1-A is a top view of the reflective element pair and FIG. 1-B is a sectional view of the reflective elements $R_1$ and $R_2$ vertical to a common bottom plane ($S_x$–$S_x'$) including the points $C_2$, $H_2$, $H_1$, and $C_1$ in FIG. 1-A and base edges (x,x, . . . ) shared by many paired reflective elements.

Moreover, in FIGS. 1-A and 1-B, $H_1$ and $H_2$ express apexes of cube corners of the reflective elements $R_1$ and $R_2$, the reflective elements $R_1$ and $R_2$ protrude onto the shared bottom plane ($S_x$–$S_x'$) and are faced each other by sharing one base edge (x,x, . . . ) on the bottom plane ($S_x$–$S_x'$) to constitute a pair of CC reflective element pairs in a CC retroreflective bodies arranged on the bottom plane ($S_x$–$S_x'$) in the closest-packed state.

Moreover, the dotted line ($H_1$-P) in FIG. 1-B denotes a vertical line right-angled to the bottom plane ($S_x$–$S_x'$) from the apex $H_1$ of the reflective element $R_1$ and the dotted line ($H_1$-Q) denotes an optical axis passing through the apex $H_1$ of the reflective element $R_1$, and therefore, the tilt of the reflective element $R_1$ is shown by θ.

Furthermore, the line x—x in FIG. 1-A shows one base edge (x,x, . . . ) shared by the pair of CC reflective elements $R_1$ and $R_2$ on one bottom plane ($S_x$–$S_x'$) shared by the CC reflective elements $R_1$ and $R_2$, the intersection with a vertical plane to the bottom plane ($S_x$–$S_x'$) from apexes of the reflective elements is shown by P, and the intersection of an optical axis via the apex $H_1$ of the reflective element $R_1$ and the bottom plane ($S_x$–$S_x'$) is shown by Q.

Furthermore, in FIG. 1-B, the line Lx—Lx denotes a plane vertical to one bottom plane ($S_x$–$S_x'$) shared by the reflective elements $R_1$ and $R_2$ on one base edge (x) shared by the both elements $R_1$ and $R_2$.

The reflective elements $R_1$ and $R_2$ form a substantially-same-shaped element pair faced each other so as to be substantially symmetric to the plane ($L_x$—$L_x$) vertical to the bottom plane ($S_x$–$S_x'$) and the same is applied to FIGS. 3-A and 3-B and FIGS. 4-A and 4-B to be described later.

In the present invention, the fact that the tilt {tilt from the shared bottom plane ($S_x$–$S_x'$)} of the optical axis ($H_1$-Q) of the reflective element $R_1$ is plus (+) denotes that (q–p) is plus (+), the fact that the tilt of it is minus denotes that (q–p) is minus, and the fact that (q–p) is 0 denotes that the optical axis is vertical to the common bottom plane ($S_x$–$S_x'$) including base edges (x,x, . . . ) of many paired reflective elements.

The present invention is characterized in that a triangular-pyramidal cube-corner retroreflective element has an optical axis tilting by 0.5 to 1.5° and particularly, a triangular-pyramidal cube-corner retroreflective element having an optical axis tilting by 0.6 to 1.4° is preferable. In FIG. 1-B, the tilt θ of the optical axis is emphasized into approx. 5° instead of a tilt of 0.5 to 1.5° of a CC reflective element of the present invention so that a tilt state can be easily understood. The same is applied to FIGS. 3-B and 4-B to be described later.

In the case of the present invention, though it is allowed that the tilt of an optical axis {that is, the above (q–p)} is a plus (+) direction or a minus direction (−), it is preferable that the optical axis tilts in the plus (+) direction.

Therefore, in the case of the present invention, a triangular-pyramidal cube-corner retroreflective element is preferable in which the optical axis of the triangular-pyramidal reflective elements tilts by 0.6 to 1.4° in the direction in which the difference (q–p) between the distance (q) from the intersection (Q) of the optical axis and the bottom plane ($S_x$–$S_x'$) up to the base edges (x,x, . . . ) shared by the element pair and the distance (p) from the intersection (P) of a vertical line extended from apexes (H1 and H2) of the elements to the bottom plane ($S_x$–$S_x'$) and the bottom plane ($S_x$–$S_x'$) up to the base edges (x,x, . . . ) shared by the element pair becomes plus (+).

According to the study by the present inventor et al., it is found that the above reflective element of the present invention is particularly superior not only in entrance angularity but also in rotation angularity.

Figure 2:
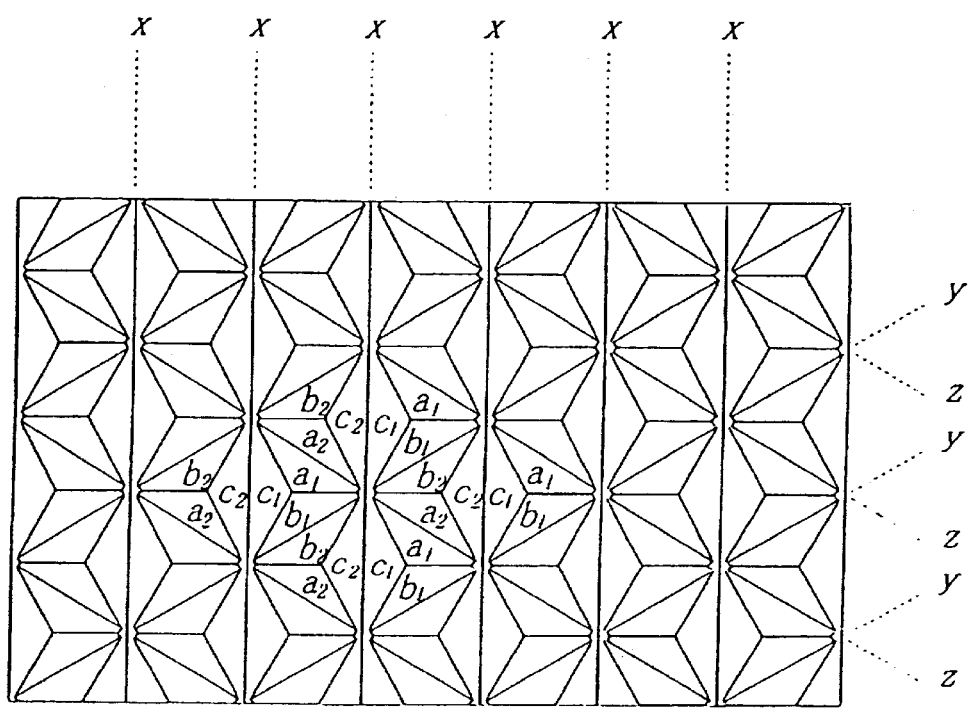
FIG. 2 is a top view of a CC retroreflective body in which the base edge (x) among three base edges (x), (y), and (z) is formed more deeply than the other base edges (y) and (z) and a CC reflective element pair of the present invention whose optical axis tilts in the plus (+) direction is set.
Figure 3:
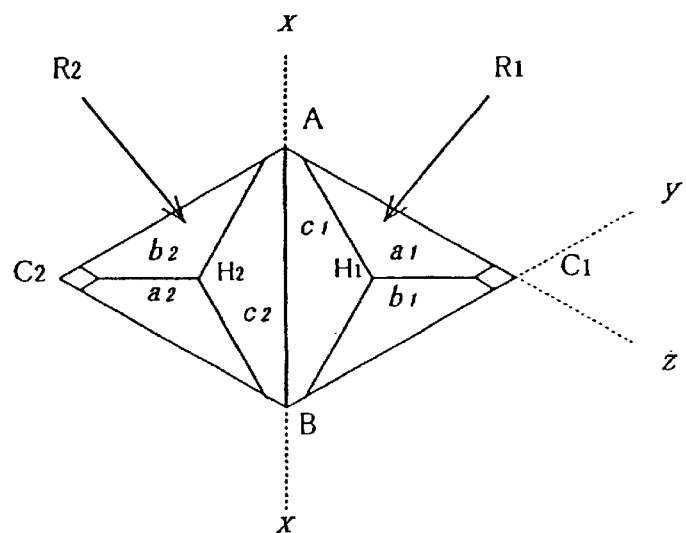
FIG. 3-A is a top view of a pair of CC reflective elements in the CC retroreflective body shown in FIG. 2 and FIG. 3-B is a sectional view of the CC reflective element pair.
Figure 3:
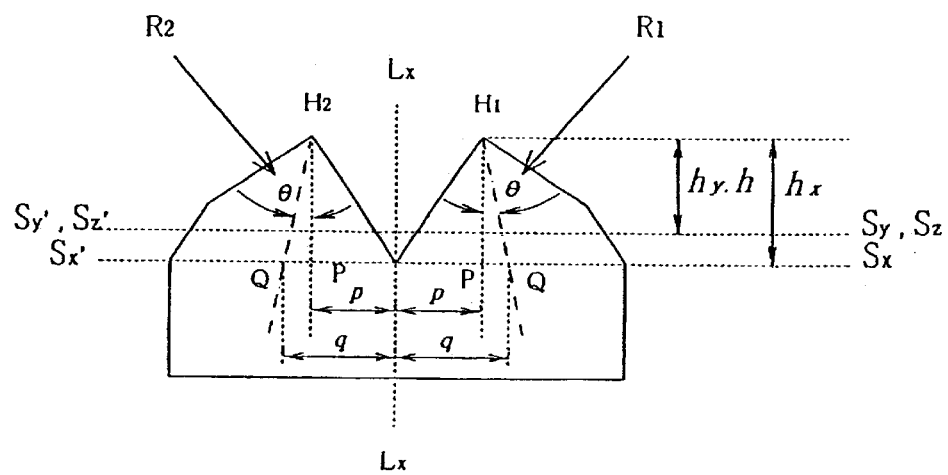

FIG. 2 and FIGS. 3-A and 3-B show another mode of a pair of triangular-pyramidal cube-corner retroreflective elements (CC reflective elements) $R_1$ and $R_2$ of the present invention, in which FIG. 2 is a top view of a CC retroreflective body in which reflective elements are arranged, FIG. 3-A is a top view of a pair of elements of the CC retroreflective body shown in FIG. 3, and FIG. 3-B is a sectional view of the reflective elements $R_1$ and $R_2$ vertical to a common bottom plane ($S_x$–$S_x'$) including base edges (x,x, . . . ) including points $C_2$, $H_2$, $H_1$, and $C_1$ in FIG. 3-A and shared by many paired reflective elements.

In FIG. 2, $a_1$, $b_1$, and $c_1$ and $a_2$, $b_2$, and $C_2$ denote lateral faces of many arranged reflective elements such as the reflective elements $R_1$ and $R_2$ in FIG. 2-A, x denotes an adjacent reflective element such as a base edge shared by lateral faces (faces $c_1$ and $C_2$) of $R_1$ and $R_2$, y denotes a base edge shared by lateral faces (faces $b_1$ and $b_2$) of an adjacent reflective element separate from $R_1$ and $R_2$, and z denotes a base edge shared by lateral faces ($a_1$ and $a_2$) of a still another adjacent reflective element. Reflective elements adjacent by sharing the above base edges (x,x, . . . ) include the above base edges (x,x, . . . ), form a substantially-same-shaped element pair faced each other so as to be substantially symmetric to planes ($L_x$–$_x$, $L_x$—$L_x$, . . . ) vertical to the bottom plane ($S_x$–$S_x'$), and are arranged on the bottom plane ($S_x$–$S_x'$) in the closest-packed state.

In FIGS. 3-A and 3-B, a dotted line $S_x$–$S_x'$ denotes a bottom plane including the above base edges (x,x, . . . ) and a dotted line $S_y$–$S_y'$ denotes a bottom plane including the above base edges (y,y, . . . ), and a dotted line $S_z$–$S_z'$ denotes a bottom plane including the above base edges (z,z, . . . ). Symbol hx denotes the height from a bottom plane ($S_x$–$S_x'$) including base edges (x,x, . . . ) shared by two triangular-pyramidal reflective elements faced each other up to apexes ($H_1$ and $H_2$) of the triangular-pyramidal reflective elements, $h_y$ denotes the height from a bottom plane ($S_x$–$S_x'$) including other base edges (y,y, . . . ) up to apexes ($H_1$ and $H_2$) of the triangular-pyramidal reflective elements, and hz denotes the height from a bottom plane ($S_x$–$S_x'$) including still other base edges (z,z, . . . ) of the triangular-pyramidal reflective elements up to apexes ($H_1$ and $H_2$) of the triangular-pyramidal reflective elements.

In the case of this mode, the bottom plane ($S_x$–$S_x'$) is present at a position lower than the bottom planes ($S_y$–$S_y'$) and ($S_z$–$S_z'$) and the bottom plane ($S_y$–$S_y'$) and the bottom plane ($S_x$–$S_x'$) are on the sample plane. That is, $h_x$ is larger than $h_y$ and $h_z$ and $h_y$ and $h_z$ are equal to each other.

Therefore, the lateral faces ($a_1$ and $a_2$) and ($b_1$ and $b_2$) are respectively formed into a shape slightly cut out by the lateral faces ($c_1$ and $C_2$) and the lateral faces ($a_1$ and $a_2$) and ($b_1$ and $b_2$) are respectively formed into a quadrangle, and the lateral faces ($c_1$ and $c_2$) are respectively formed into a pentagon.

As shown in FIG. 3-B, similarly to the case of the CC reflective elements shown in FIG. 1, optical axes ($H_1$-Q and $H_2$-Q) of the CC reflective element pair tilt by 0.5 to 1.5° in the direction in which the difference (q–p) between the distance (p) from the intersection (P) of a vertical line extended from apexes ($H_1$ and $H_2$) of the CC reflective elements up to the bottom plane ($S_x$–$S_x'$) and the distance (q) from the intersection (Q) of the optical axes and the bottom plane ($S_x$–$S_x'$) up to a base edge (x) shared by the CC reflective element pair becomes plus (+).

Figure 4:
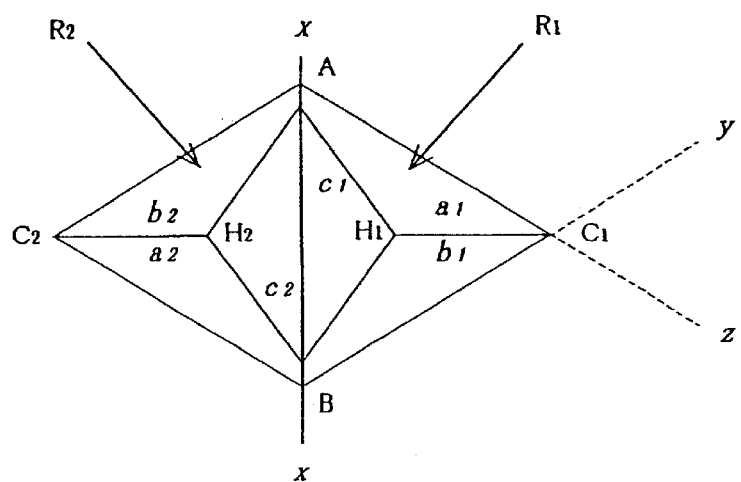
FIG. 4-A is a top view of a pair of CC reflective elements of the present invention in which the base edge (x) among three base edges (x), (y), and (z) is formed more shallowly than other base edges (y) and (z) and the optical axis tilts in the minus direction and FIG. 4-B is a sectional view of the CC reflective element pair.
Figure 4:
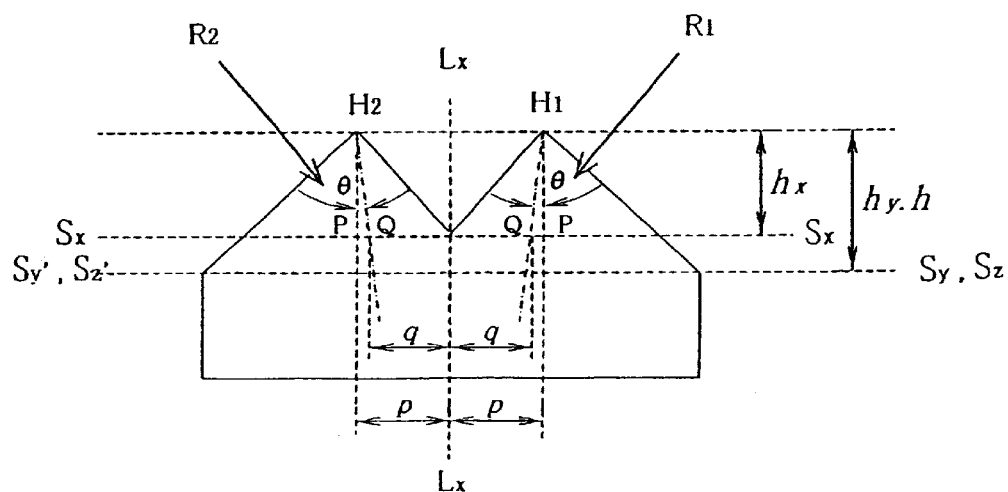

FIGS. 4-A and 4-B show still another mode of a pair of triangular-pyramidal cube-corner retroreflective elements (CC reflective elements) of the present invention, in which FIG. 4-A is a top view of the reflective element and FIG. 4-B is a sectional view of reflective elements $R_2$ and $R_1$ vertical to a common bottom plane ($S_x$–$S_x'$) including points $C_2$, $H_2$, $H_1$, and $C_1$ in FIG. 4A and base edges (x,x, ...) shared by may paired reflective elements.

In the case of this mode, the bottom plane ($S_x$–$S_x'$) including the base edges (x,x, ...) is present at a position higher than a bottom plane ($S_y$–$S_y'$) including the base edges (y,y, ...) and a bottom plane ($S_z$–$S_z'$) including the base edges (z,z, ...) and the bottom planes ($S_y$–$S_y'$) and ($S_z$–$S_z'$) are present on the same plane. That is, $h_x$ is smaller than $h_y$ and $h_z$ and $h_y$ and $h_z$ are equal to each other.

Therefore, lateral faces ($c_1$ and $C_2$) are respectively formed into a shape slightly cut out by lateral faces ($a_1$ and $a_2$) and ($b_1$ and $b_2$), lateral faces ($a_1$ and $a_2$) and ($b_1$ and $b_2$) are respectively formed into a quadrangle, and lateral faces ($c_1$ and $C_2$) are respectively formed into a triangle.

Moreover, as shown in FIG. 4-B, optical axes ($H_1$-Q and $H_2$-Q) of the CC reflective element pair tilts by 0.5 to 1.5° in the direction in which the difference (q–p) between the distance (p) from the intersection (P) of a vertical line extended from apexes ($H_1$ and $H_2$) of the CC reflective elements to the bottom plane ($S_x$–$S_x'$) and the distance (q) from the intersection (Q) of the optical axes and the bottom plane ($S_x$–$S_x'$) up to a base edge (x) shared by the CC reflective element pair becomes minus (−).

In the case of a pair of CC reflective elements of the present invention, it is allowed that $h_x$, $h_y$, and $h_z$ are equal to or different from each other when assuming the height from a bottom plane ($S_x$–$S_x'$) including base edges (x,x, ...) shared by the CC reflective elements faced each other up to apexes ($H_1$ and $H_2$) of the CC reflective element pair as $h_x$, the height from a bottom plane ($S_y$–$S_y'$) including other base edges (y,y, ...) of the CC reflective elements up to apexes ($H_1$ and $H_2$) of the CC reflective elements as $h_y$, and the height from a bottom plane ($S_z$–$S_z'$) including still other base edges (z,z, ...) of the CC reflective elements up to apexes ($H_1$ and $H_2$) of the CC reflective elements as $h_z$. From the viewpoint of entrance angularity, however, it is preferable that $h_x$ is substantially larger than $h_y$ and $h_z$ when the optical axis tilts in the direction for (q–p) to become plus (+). Moreover, when the optical tilts in the direction for (q–p) to become minus (−), it is preferable that $h_x$ is substantially smaller than $h_y$ and $h_z$.

Furthermore, when at least two of the above $h_x$, $h_y$, and $h_z$ are substantially different from each other and the maximum one of the $h_x$, $h_y$, and $h_z$ is assumed as hoax and the minimum one of them is assumed as $h_{min}$, it is preferable that an inequality "$1.03 < h_{max}/h_{min} < 1.3$" is satisfied and it is more preferable that an inequality "$1.05 < h_{max}/h_{min} < 1.2$" is satisfied.

In the case of a CC reflective element satisfying the value of the above $h_{max}/h_{min}$, it is possible to increase the quantity of light to be three-face-reflected and retroreflected because it is possible to almost equalize the area of three lateral faces ($c_1$ and $C_2$), that of lateral faces ($a_1$ and $a_2$), and that of lateral faces ($b_1$ and $b_2$) each other.

It is recommended that heights $h_x$, $h_y$, and $h_z$ of the above CC reflective element respectively preferably range between 50 and 500 μm and more preferably range between 60 and 200 μm. When any one of the heights $h_x$, $h_y$, and $h_z$ is less than 50 μm, the size of a reflective element becomes too small. Therefore, retroreflected light is extremely diverged due to the diffraction effect decided in accordance with the planar opening area of the reflective element and the front reflectivity is deteriorated. Moreover, it is not preferable that any one of the heights $h_x$, $h_y$, and $h_z$ exceeds 500 μm because the thickness of a sheeting becomes excessive and a soft sheeting cannot be easily obtained.

Furthermore, three prism face angles formed by the fact that three lateral faces ($a_1$, $b_1$, and $c_1$) or ($a_2$, $b_2$, and $C_2$) serving as prism faces of a CC reflective element of the present invention cross each other substantially form right angles. However, it is preferable that the right angle is not always a strict right angle (90.000°) but the right angle is a right angle slightly deviated from a true right angle. By providing a very slight angular deviation to the prism face angles, it is possible to properly diverge the right reflected from an obtained CC reflective element. However, when the angular deviation is too large, the light reflected from the obtained CC reflective element excessively diverges and the retroreflectivity is deteriorated. Therefore, it is preferable that at least one prism face angle formed when these three lateral faces ($a_1$, $b_1$, and $c_1$) or ($a_2$, $b_2$, and $C_2$) cross each other ranges between 89.5° and 90.5°, more preferable that the prism face angle ranges between 89.7° and 90.3°, and the angle is slightly deviated from 90.000°.

A triangular-pyramidal cube-corner retroreflective element (CC reflective element) of the present invention is used as a CC retroreflective body by collecting many CC reflective elements. Moreover, it is allowed to form many CC reflective elements into a triangular-pyramidal cube-corner retroreflective sheeting and set it onto a purposed object such as a vehicle or traffic sign or directly form many CC reflective elements on an object. Though the usage of the CC reflective elements is not restricted, they are generally used by forming them into a sheeting.

Figure 5:
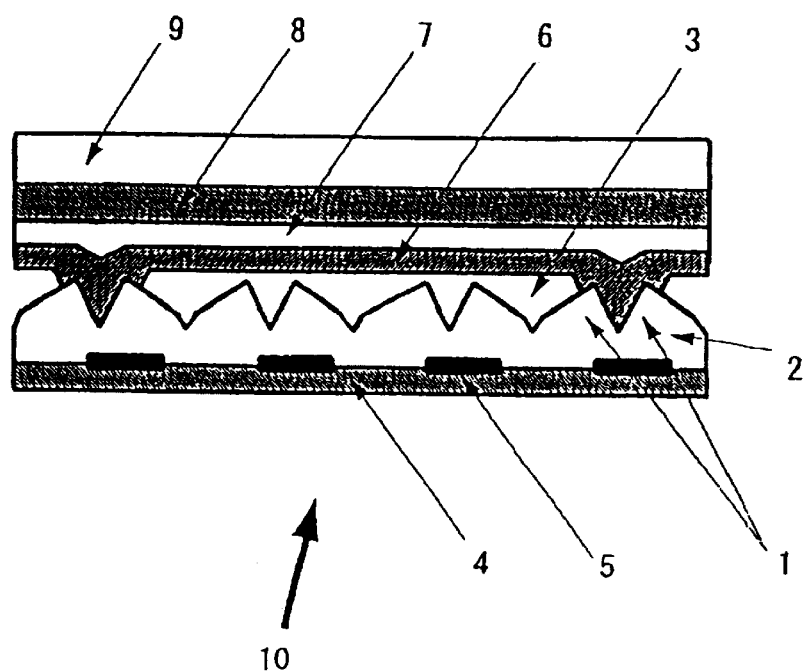
FIG. 5 is a sectional view showing a structure of a triangular-pyramidal cube-corner retroreflective sheeting in which CC reflective elements of the present invention are arranged.

Then, a mode of a preferable structure of a triangular-pyramidal cube-corner retroreflective sheeting on which CC reflective elements of the present invention are arranged is described below by referring to FIG. 5 showing a sectional view of the mode.

In FIG. 5, symbol 1 denotes a reflective element layer on which triangular-pyramidal reflective elements ($R_1$ and $R_2$) are arranged in the closest-packed state, 2 denotes a holding-body layer for holding CC reflective elements, and 10 denotes a light entrance direction. Though the reflective element layer (1) and holding-body layer (2) are generally united into one body, it is also allowed to laminate separate layers. In accordance with an applying purpose or applying environment of a retroreflective sheeting of the present invention, it is possible to add a surface protective layer (4), a printing layer (5) for transferring information to an observer or coloring the sheeting, a binder layer (6) for realizing an airtight structure for preventing moisture from entering the back of a CC reflective element, a support layer (7) for supporting the binder layer (6), and an adhesive layer (8) for attaching the retroreflective sheeting to other structure and a release-agent layer (9) such as a release film.

It is possible to use the resin same as that used for the reflective element layer (1) for the surface protective layer (4). However, it is also allowed to mix an ultraviolet absorbent, a light stabilizer, and an antioxidant in the surface protective layer (4) independently or by combining them in order to improve the weather resistance. Moreover, it is possible to make the layer (4) contain various organic pigments, inorganic pigments, and dyes as coloring agents.

It is generally possible to set the printing layer (5) between the surface protective layer (4) and the holding-material layer (2) or on the surface protective layer (4) or the reflective face of the CC reflective element (1) by a means such as gravure printing, screen printing, or ink-jet printing.

It is possible to use any material for the reflective element layer (1) and holding-body layer (2) as long as the material meets the flexibility that is one of the objects of the present invention. However, it is preferable to use a material having optical transparency and uniformity. The following are materials which can be used for the present invention: polyolefin resins such as a polycarbonate resin, vinyl chloride resin, (meth)acrylic resin, epoxy resin, polystyrene resin, polyester resin, fluorocarbon resin, polyethylene resin, and polypropylene resin and cellulose-based resins, and polyurethane resins.

In the case of the reflective element layer (1) of the present invention, it is general to set the air layer (3) to the back of a cube-corner retroreflective element in order to increase a critical angle for satisfying the internal total reflection condition. To prevent troubles such as decrease of a critical angle due to incoming of moisture and corrosion of a metallic layer, it is preferable that-the reflective element layer (1) and support layer (7) are sealed by the binder layer (6). As the sealing method, it is possible to use the methods disclosed in U.S. Pat. Nos. 3,190,178 and 4,025,159 and Japanese Utility Model No. 28669/1975. The following resins are sued for the binder layer (6): (meth)acrylic resin, polyester resin, alkyd resin, and epoxy resin. As joining methods, it is possible to properly use publicly-known thermal-fusion-bonding-resin joining method, thermosetting-resin joining method, ultraviolet-curing-resin joining method, and electron-beam-curing-resin joining method.

It is possible to apply the binder layer (6) to the entire surface of the support layer (7) or selectively set the layer (6) to the joint with a retroreflective-element layer in accordance with the printing method or the like.

As a material for forming the support layer (7), it is possible to use a resin for forming a retroreflective-element layer, a resin capable of forming a general film, fiber, cloth, and a metallic foil or plate made of stainless steel or aluminum individually or by combining them.

It is possible to properly select a publicly-known material for the adhesive layer (8) and the release-agent layer (9) for the adhesive used to attach a retroreflective sheeting of the present invention to a wood plate, glass plate, or plastic plate.

A triangular-pyramidal cube-corner retroreflective sheeting on which CC reflective elements of the present invention are arranged is generally used so that the light 10 enters from the upper portion of the surface protective layer (1) by turning the CC reflective elements shown in FIG. 5 upside down. Therefore, the sheeting can be manufactured by using a cube-corner-molding die in which shapes of the above-described CC reflective elements are arranged on a metallic belt as reversed concave shapes in the closest-packed state, thermally pressing a proper soft resin sheeting superior in optical transparency and uniformity to be described later against the molding die, and inversely transferring the shapes of the die to the resin sheeting.

A typical manufacturing method of the above cube-corner-molding die is described in the above Stamm's patent in detail and it is possible to use a method conforming to the above method for the present invention.

Specifically, a microprism mother die in which convex fine triangular pyramids are arranged in the closest-packed state is formed by using a carbide cutting tool (such as diamond cutting tool or tungsten-carbide cutting tool) having a tip angle of approx. 67.5 to 73.5°, deciding two-directional (y-direction and z-direction in FIG. 2) repetitive pitches, groove depths ($h_y$ and $h_z$), and mutual crossing angles in accordance with the shape of a purposed CC reflective element, cutting parallel grooves respectively having a V-shaped cross section, and then cutting V-shaped parallel grooves in the third direction (x direction) at a repetitive pitch (repetitive pitch of the line x in FIG. 2) passing through the intersection of the formed y-directional groove and z-directional groove and bisecting the supplementary angle of the crossing angle of these two directions (in this case, an acute angle is referred to as "crossing angle").

In the case of a preferred mode of the present invention, y-directional and z-directional repetitive pitches range between approx. 210.3 and 214.2 μm, groove depths ($h_y$ and $h_x$) range between approx. 50 and 500 μm, a mutual crossing angle ranges between approx. 59.1 and 60.9°, an x-directional groove depth ranges between approx. 208.6 and 216.4 μm, and a depth ($h_x$) ranges between approx. 38.5 and 650 μm.

These x-, y-, and z-directional grooves are cut so that each groove cross section is generally formed into an isosceles triangle. However, it is also possible to cut at least one-directional groove among these three directional grooves so that the cross section of the groove is slightly deviated from an isosceles triangle according to necessity. Specifically, one of the following methods can be used: a method of cutting a groove by a cutting tool whose front-end shape is asymmetric to right and left or cutting a groove while slightly tilting a cutting tool whose front-end shape is symmetric to right and left. Thus, it is possible to provide a very-small angular deviation from the right angle (90°) for at least one of the prism face angles of three lateral faces ($a_1$, $b_1$, and $c_1$) or ($a_2$, $b_2$, and $C_2$) of a CC reflective element obtained by slightly deviating the cross section of a groove from an isosceles triangle and thereby, properly diverge the light reflected from the CC reflective element from a complete retroreflective direction.

As a base material which can be preferably used to form the above mother die, it is preferable to use a metallic material having a Vickers hardness (JIS Z 2244) of 300 or more, particularly preferable to use a metallic material having a Vickers hardness of 380 or more. Specifically, any one of amorphous copper, electrodeposition nickel, and aluminum can be used. As an alloy-based material, it is possible to use any one of copper-zinc alloy (brass), copper-tin-zinc alloy, nickel-cobalt alloy, nickel-zinc alloy, and aluminum alloy.

Moreover, as the above base material, it is also possible to use a synthetic resin material. Because a trouble that a material is softened when cut and thereby it is difficult to cut the material at a high accuracy does not easily occur, it is preferable to use a material made of a synthetic resin having a glass transition point of 150° C. or higher, particularly 200° C. or higher and a Rockwell hardness (JIS Z 2245) of 70 or more, particularly 75 or more. Specifically, it is possible to use any one of polyethylene-terephthalate-based resin, polybutylene-terephthalate-based resin, polycarbonate-based resin, polymethacrylate-based resin, polyimide-based resin, polyacrylate-based resin, polyether-sulfone-based resin, polyether-imide-based resin, and cellulose-triacetate-based resin.

A flat plate can be formed by any one of the above synthetic resins in accordance with the normal resin-forming method such as the extraction-molding method, calender-molding method, or solution cast method and moreover, heating or drawing can be performed according to necessity. It is possible to apply the preparatory conduction treatment to the plane of the flat plate thus formed in order to simply the conduction treatment and/or electroforming when forming an electroforming die from a prism mother die manufactured in accordance with the above method.

The preparatory conduction treatment includes the vacuum evaporation method for evaporating metals such as gold, silver, copper, aluminum, zinc, chromium, nickel, and selenium, the anode-sputtering method for using the above metals, and the electroless plating method using copper and nickel. Moreover, it is allowed to blend conductive powder such as carbon black or organic metallic salt into a synthetic resin so that a flat plate has conductivity.

Then, the surface of the obtained microprism mother die is electroformed and a metallic film is formed on the surface. By removing the metallic film from the surface of the mother die, it is possible to form a metallic die used to mold a triangular-pyramidal cube-corner retroreflective sheeting of the present invention.

In the case of a metallic microprism mother die, immediately after cleaning the surface of the die, it is possible to electroform the surface. In the case of a synthetic-resin microprism mother die, it is necessary to apply the conduction treatment for providing conductivity to the surface of the prism of the mother die before electroforming the surface. As the conduction treatment, it is possible to use any one of the silver mirror treatment, electroless plating, vacuum evaporation, and cathode sputtering.

As the above silver mirror treatment, it is possible to use a method of cleaning the surface of a mother die formed by the above-described method with an alkaline detergent to remove the contamination such as oil component or the like, then activating the surface with a surface activator such as tannic acid, and then finishing the surface like a silver mirror. To finish the surface like a silver mirror, either of the following methods can be used: the spraying method using a double-cylinder-type nozzle gun for a silver-nitride aqueous solution and a reducing-agent (glucose or glyoxal) aqueous solution and the method of immersing a mother die in a mixed solution of the silver-nitride aqueous solution and reducing-agent aqueous solution. Moreover, it preferable that the thickness of a sliver-mirror film is smaller as long as the conductivity under electroforming is satisfied and for example, a thickness of 0.1 $\mu$m or less can be used.

Electroless plating uses copper or nickel. An electroless plating solution can use nickel sulfate or nickel chloride as a water-soluble metallic salt of nickel. A solution obtained by adding a solution mainly containing citrate or malate to the water-soluble metallic salt of nickel as a complexing agent and sodium hypophosphite or amine Volan to the metallic salt as a reducing agent is used as a plating solution.

The vacuum evaporation can be performed by cleaning the surface of a mother die similarly to the case of the sliver mirror treatment, then putting the die in a vacuum system, heating and vaporizing a metal such as gold, silver, copper, aluminum, zinc, nickel, chromium, or selenium and precipitating it on the cooled mother-die surface, and forming a conductive film. Moreover, the cathode sputtering can be formed by putting a mother die treated same as the case of the vacuum evaporation in a vacuum system in which a flat cathode plate capable of mounting a desired metallic foil and an anode table made of a metal such as aluminum or iron for mounting a material to be treated are set and putting the mother die on the anode table, setting a metallic foil same as one used for the case of the vacuum evaporation to a cathode and electrifying the foil to cause glow discharge, making a cation flow generated by the glow discharge collide with the metallic foil on the cathode and thereby evaporating metallic atoms or particulates, and precipitating the atoms or particulates on the surface of the mother die to form a conductive film. A thickness of 300 Å can be used as the thickness of conductive films formed by theses methods.

To form a smooth and uniform electroformed layer on a synthetic-resin mother die through electroforming, it is necessary to uniformly apply the above conduction treatment to the entire surface of the mother die. When the conduction treatment is ununiformly performed, a trouble may occur that the smoothness of the surface of an electroformed layer having a low conductivity is deteriorated and no electroformed layer is formed but a defect is formed.

To avoid the above trouble, it is possible to use a method for improving the wetting of a silver-mirror solution by treating a treatment face with alcohol immediately before starting the silver mirror treatment. However, because a synthetic-resin mother die formed in the present invention has a very-deep concave portion forming an acute angle, improvement of wetting tends to be insufficient. A trouble of a conductive film due to the concave portion also easily occurs in the evaporation.

To uniform the surface of an electroformed layer obtained through electroforming, activation is frequency performed. As the activation, it is possible to use a method of immersing the electroformed layer in a 10-wt % sulfamic-acid aqueous solution.

When electroforming a synthetic-resin mother die silver-mirror treated, a silver layer is integrated with an electroformed layer and easily removed from the synthetic-resin mother die. However, when forming a conductive film made of nickel or the like through electroless plating or cathode sputtering, it may be difficult to remove an electroformed layer from a synthetic-resin layer because the surface of the synthetic-resin layer closely contacts with the conductive film. In this case, it is preferable to apply the so-called removal treatment such as chromating onto a conductive-film layer before electroforming. In this case, the conductive-film layer remains on a synthetic-resin layer after removed.

In the case of a synthetic-resin prism mother die on whose surface a conductive-film layer is formed, the above various treatments are applied and then an electroformed layer is formed on the conductive-film layer by electroforming. Moreover, in the case of a metallic prism mother die, the surface is cleaned according to necessity as described above and then, an electroformed layer is directly formed on the metal.

Electroforming is generally performed in a 60-wt % aqueous solution of nickel sulfamate at 40° C. under a current condition of approx. $10A/dm^2$. By setting an electroformed-layer forming rate to, for example, 48 hr/mm or less, a uniform electroformed layer can be easily obtained. However, at a forming rate of 48 hr/mm or higher, a trouble easily occurs that the smoothness of the surface of a layer is deteriorated or a defect is formed.

Moreover, in the case of electroforming, it is possible to electroform a nickel-cobalt alloy to which a component such as cobalt is added in order to improve the surface abrasiveness of a die. By adding 10 to 15 wt % of cobalt, it is possible to increase the Vickers hardness Hv of an obtained electroformed layer up to 300 to 400, it is possible to mold a synthetic resin by using an obtained electroforming die and improve the durability of the die when manufacturing a triangular-pyramidal cube-corner retroreflective sheeting of the present invention.

A first-generation electroforming die thus formed from a prism mother die can be repeatedly used as an electroforming master used to further form a second-generation electroforming die. Therefore, it is possible to form several electroforming dies by one prism mother die.

It is possible to use a plurality of formed electroforming dies by precisely cutting them and then, combining and joining them up to a final die size for molding a microprism sheeting using a synthetic resin. To join the electroforming dies, it is possible to use one of a method of merely bringing cut ends face to face and a method of welding combined joints through electron-beam welding, YAG laser welding, or carbonic-acid-gas laser welding.

Combined electroforming dies are used to mold a synthetic resin as synthetic-resin molding dies. The synthetic-resin molding method can use compression molding or extrusion molding. The compression molding can be performed by inserting a formed thin-wall nickel electroforming die, a synthetic-resin sheeting having a predetermined thickness, and a silicon-rubber sheeting having a thickness of approx. 5 mm serving as a cushion material into a compression-molding press heated up to a predetermined temperature, then preheating them for 30 sec at a pressure of 10–20% of a molding pressure, and then heating and pressing them for approx. 2 min at 180–250° C. and 10–30 kg/cm². Thereafter, it is possible to obtain a molded product by cooling the above components up to room temperature while pressing them and then releasing the pressure.

Moreover, it is possible to obtain a continuous sheet-like product by joining a thin-wall electroforming die having a thickness of approx. 0.5 mm formed by the above method, forming an endless belt die by the above welding method, setting and rotating the belt die on a pair of rollers constituted by a heating roller and a cooling roller, supplying melted synthetic resin to the belt die on the heating roller in the form of a sheet, pressure-molding the synthetic resin with one or more silicon rollers, then cooling the synthetic resin to the glass transition point temperature or lower with the cooling roller, and removing the resin from the belt die.

The present invention is more minutely described below in accordance with embodiments.

Embodiment 1:

Parallel grooves respectively having a V-shaped cross section are formed on a 100 mm-square brass plate whose surface is flatly ground are cut in accordance with the fly cutting method at a repetitive pattern by using a diamond cutting tool having a tip angle of 68.53° so that in the first direction (y-direction in FIG. 2) and the second direction (z-direction in FIG. 2), first- and second-directional pitches are 210.88 $\mu$m, groove depths ($h_y$ and $h_x$) are 100 $\mu$m, and a crossing angle between the first and second directions is 58.76°.

Thereafter, the V-shaped parallel grooves are cut by using a diamond cutting tool having a tip angle of 71.52° so that a repetitive pitch (repetitive pitch of the line x in FIG. 1) is 214.92 $\mu$m, the groove depth ($h_x$) is 100 $\mu$m, and crossing angles between the first, second, and third directions are 60.62° to form a mother die in which many convex triangular-pyramidal cube corners having the height ($h_x$) of 100 $\mu$m from a virtual plane ($S_x$–$S_x'$) of a triangular-pyramidal reflective element are arranged in the closest-packed state. The optical-axis tilt angle θ of the triangular-pyramidal reflective element is +1° and prism face angles of three faces constituting a triangular pyramid are 90°.

A concave cube-corner-molding die which is made of nickel and whose shape is reversed is formed by using the above brass mother die in accordance with the electroforming method. By using the molding die, a polycarbonate-resin sheeting (Iupilon E2000 made by Mitsubishi Engineering-Plastics Corp.) having a thickness of 200 $\mu$m is compression-molded at a molding temperature of 200° C. and a molding pressure of 50 kg/cm², then, cooled up to 30° C. under the pressure, and then taken out to form a triangular-pyramidal cube-corner retroreflective sheeting made of polycarbonate resin in which cube corners whose support layer has a thickness of approx. 250 $\mu$m and $h_x$, $h_x$, and hz are all equal to 100 $\mu$m are arranged in the closest-packed state.

Embodiment 2:

Grooves respectively having a V-shaped cross section are cut on a 100 mm-square brass plate whose surface is flatly ground at a repetitive pattern in accordance with the fly cutting method by using a diamond cutting tool having a tip angle of 68.53° in the first direction (y-direction) and the second direction (z-direction) and a tip angle of 7.152° in the third direction (x-direction) so that repetitive pitches in the first and second directions are 210.88 $\mu$m, cut-groove depths ($h_y$ and $h_z$) are 100 $\mu$m, the crossing angle between the first and second directions is 58.76°, the repetitive pitch in the third direction is 214.92 $\mu$m, and a cut-groove depth ($h_x$) is 110 $\mu$m to form a mother die in which many convex triangular-pyramidal cube corners having the height ($h_y$) of 100 $\mu$m from a virtual plane ($S_y$–$S_y'$) of a triangular-pyramidal reflective element are arranged in the closest-packed state. The optical-axis tilt angle θ of the triangular-pyramidal reflective element is +1°. Moreover, the value of hmax/hmin is 110/100=1.100.

Then, a concave cube-corner molding die made of nickel is formed similarly to the case of Embodiment 1 and a polycarbonate-resin sheeting same as that of Embodiment 1 is formed by using the die under the same conditions as the case of Embodiment 1 by using the die to form a triangular-pyramidal cube-corner retroreflective sheeting made of polycarbonate resin on whose surface cube corners respectively having a support-layer thickness of approx. 250 $\mu$m and having $h_y$ and $h_z$ of 100 $\mu$m respectively and $h_x$ of 110 $\mu$m are arranged in the closest-packed state.

Embodiment 3:

Parallel grooves respectively having a V-shaped cross section are cut in the first and second directions at a repetitive pattern in accordance with the fly cutting method by using a diamond cutting tool having a tip angle of 72.53° so that repetitive pitches in the first and second directions are 213.5 $\mu$m, groove depths ($h_y$ and $h_z$) are 100 $\mu$m, and the crossing angle between the first and second directions is 61.21°.

Thereafter, V-shaped parallel grooves are cut in the third direction (x-direction) by using a diamond cutting tool having a tip angle of 69.52° so that the repetitive pitch (repetitive pitch of the line x in FIG. 1) is 209.67 $\mu$m, the groove depth ($h_x$) is 100 $\mu$m, and the crossing angle between the first and second directions is 59.40° to form a mother die in which many convex triangular-pyramidal cube corners having the height ($h_x$) of 100 $\mu$m from a virtual plane ($S_x$–$S_x'$) of a triangular-pyramidal reflective element are arranged in the closest-packed state on a brass plate. The optical-axis tilt angle θ of the triangular-pyramidal reflective element is −1° and three prism faces constituting a triangle are all 90°.

A cube-corner-molding die made of nickel is formed similarly to the case of Embodiment 1 and a polycarbonate-resin sheeting same as that of Embodiment 1 is compression-molded by using the die under the same molding conditions as the case of Embodiment 1 to form a triangular-pyramidal cube-corner retroreflective sheeting made of polycarbonate resin in which cube corners having a support-layer thickness of approx. 250 $\mu$m and having $h_x$=$h_z$=$h_z$ of 100 $\mu$m are arranged in the closest-packed state.

Embodiment 4:

Grooves respectively having a V-shaped cross section are cut on a 100 mm-square brass plate whose surface is flatly ground at a repetitive pattern in accordance with the fly cutting method by using a diamond cutting tool having a tip angle of 72.53° in the first direction (y-direction) and second direction (z-direction) and a tip angle of 69.52 in the third direction (x-direction) so that repetitive pitches in the first and second directions are 213.50 μm, groove depths ($h_y$ and $h_z$) are 100 μm, and the crossing angle between the first and second directions is 61.21°, the repetitive pitch in the third direction is 209.67 μm, and the cut groove depth ($h_x$) is 90 μm to form a mother die in which many convex triangular-pyramidal cube corners having the height of 100 μm from a virtual plane ($S_y$–$S_y'$) of a triangular-pyramidal reflective element are arranged in the closest-packed state on the brass plate. The optical-axis tilt angle θ of the triangular-pyramidal reflective element is –1°. Moreover, the value of $h_{max}/h_{min}$ is 100/90=1.11.

Then, a concave cube-corner-molding die made of nickel is formed similarly to the case of Embodiment 1 and a polycarbonate-resin sheeting same as that of Embodiment 1 is compression-molded by using the die under the same molding conditions as the case of Embodiment 1 to form a triangular-pyramidal cube-corner retroreflective sheeting made of polycarbonate resin in which cube corners having a support-layer thickness of approx. 250 μm and having $h_y=y_z=100$ μm and $h_x=90$ μm are arranged in the closest-packed state.

COMPARATIVE EXAMPLE 1:

Grooves respectively having a V-shaped cross section are cut on a 100 mm-square brass plate whose surface is flatly ground at a repetitive pattern in accordance with the fly cutting method by using a diamond cutting tool having a tip angle of 70.53° in the first direction (y-direction), second direction (z-direction), and third direction (x-direction) so that repetitive pitches in the first, second, and third directions are 212.13 μm and the crossing angle between the first and second directions is 60.00° to form a mother die in which many convex triangular-pyramidal cube corners whose cube-corner retroreflective elements have a height of 100 μm are arranged on the brass plate in the closest-packed state. The optical-axis tilt angle θ of the reflective elements is 0° and three prism faces constituting a triangular pyramid are all 90°.

A triangular-pyramidal cube-corner retroreflective sheeting made of polycarbonate resin is formed in accordance with the same method as the case of Embodiment 1.

COMPARATIVE EXAMPLE 2:

Grooves respectively having a V-shaped cross section are cut on a 100 mm-square brass plate whose surface is flatly ground at a repetitive pattern in accordance with the fly cutting method by using a diamond cutting tool having a tip angle of 62.53° in the first direction (y-direction) and the second direction (z-direction) and a tip angle of 74.37° in the third direction (x-direction) so that repetitive pitches in the first and second directions are 207.68 μm and the repetitive pitch in the third direction is 225.42 μm and the crossing angle between the first and second directions is 54.86° to form a mother die in which many convex triangular-pyramidal cube corners whose reflective elements have a height of 100 μm are arranged on the brass plate in the closest-packed state. The optical-axis tilt angle θ of the cube-corner retroreflective elements is +4° and three prism faces constituting a triangular pyramid are all 90°.

A triangular-pyramidal cube-corner retroreflective sheeting made of polycarbonate resin is formed in accordance with the same method as the case of Embodiment 1.

Table 1 shows values of retroreflection coefficients of the triangular-pyramidal retroreflective sheetings formed for said Embodiments 1 to 4 and Comparative Examples 1 and 2 (units of reflectivities are all $cd/L_x*m^2$).

A retroreflection coefficient is measured in accordance with the photometric measuring method specified in JIS Z8714 Retroreflectors-Optical Properties-Measuring Method to measure combinations of observation angles and entrance angles as 0.2°/5° and 0.2°/30°. Moreover, for a rotation angle of a measurement sample, the direction of a third-directional V-groove is decided as 0° and the direction obtained by rotating the measurement sample by 90° from the direction of the V-groove is decided as a rotation angle of 90° to perform measurement.

Figure 6:
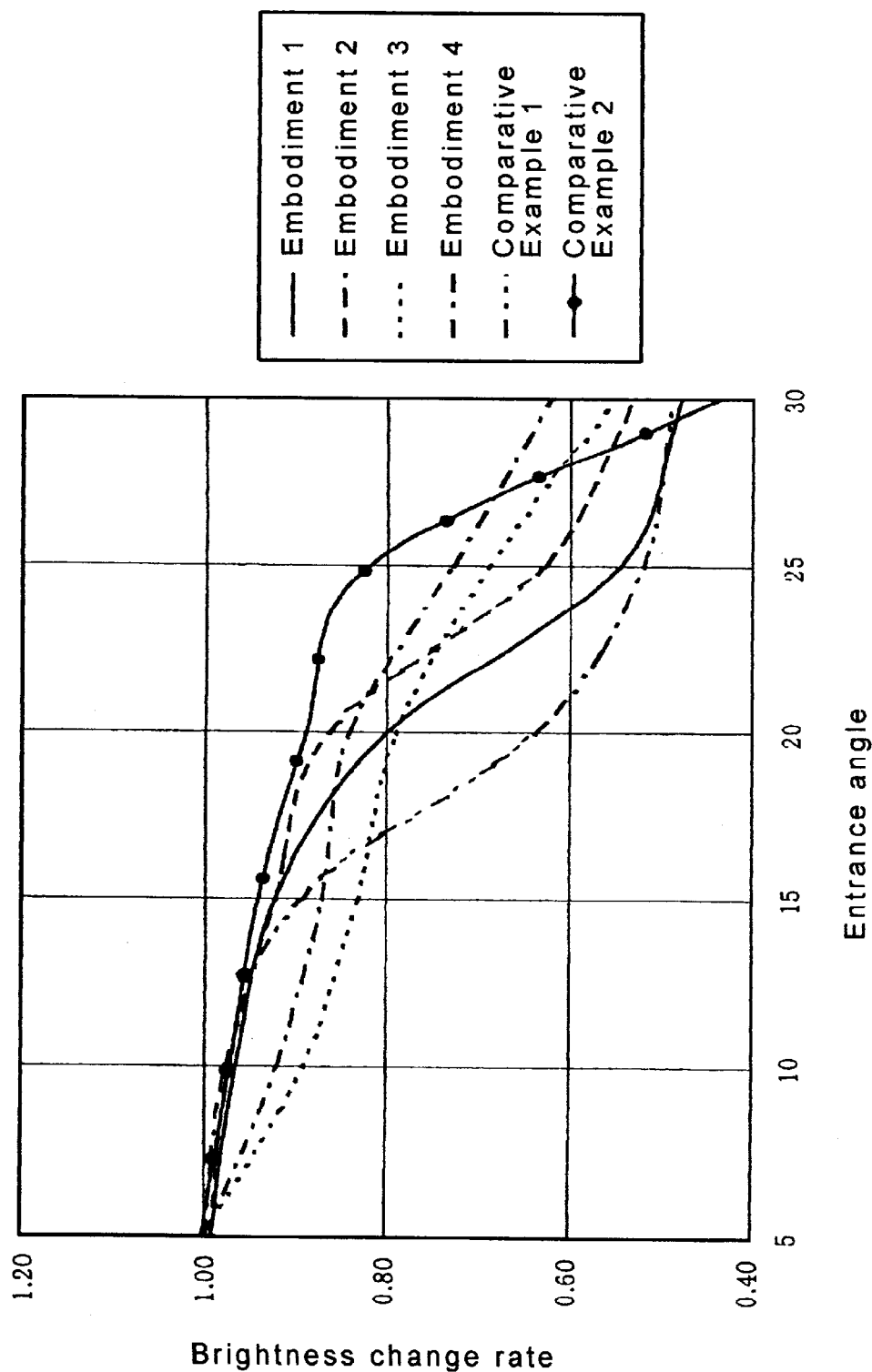
FIG. 6 is an illustration showing entrance angularities of triangular-pyramidal cube-corner retroreflective sheetings prepared for Embodiments 1 and 2 and Comparative Examples 1 and 2.

To observe entrance angularities of the triangular-pyramidal retroreflective sheetings prepared for said Embodiments 1 to 4 and Comparative Examples 1 and 2, retroreflection coefficients of samples are measured by setting an observation angle to a constant value of 0.2° and changing entrance angles from 5° to 10°, 15°, 20°, 25°, and 30° and shown in FIG. 6 by assigning entrance angles to the abscissa and values obtained by dividing retroreflection coefficients at various entrance angles by the retroreflection coefficient at an entrance angle of 5° to the ordinate as brightness change rates.

Figure 7:
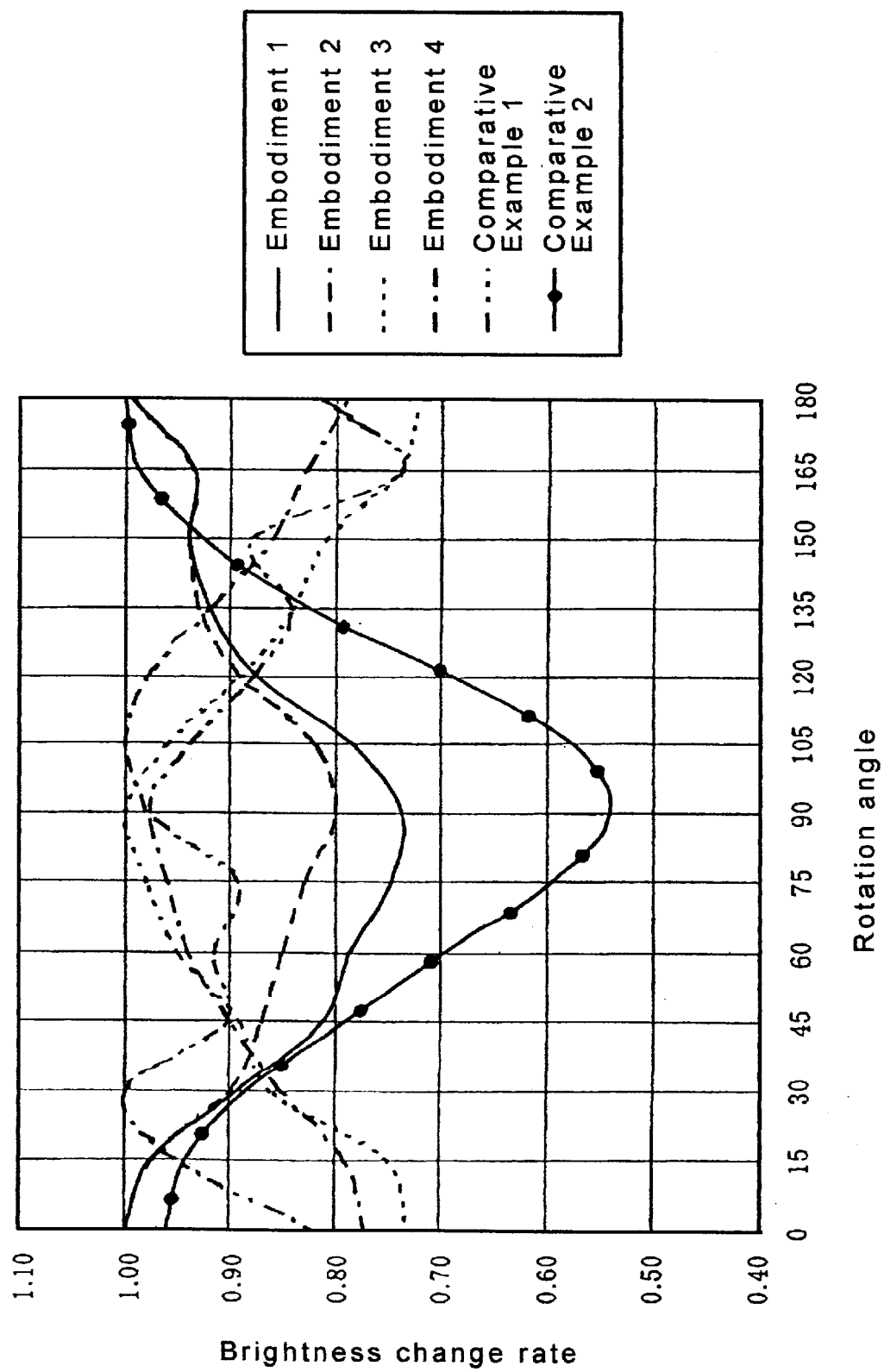
FIG. 7 is an illustration showing rotation angularities of triangular-pyramidal cube-corner retroreflective sheetings prepared for Embodiments 1 and 2 and Comparative Examples 1 and 2.

Moreover, to observe rotation angularities of the above samples, retroreflection coefficients of various samples are measured by setting an observation angle to a constant value of 0.2° and an entrance angle to a constant value of 5° and changing rotation angles from 0° to 180° and shown in FIG. 7 by assigning rotation angles to the abscissa and values obtained by retroreflection coefficients at various rotation angles by the maximum retroreflection coefficient of each sample to the ordinate as brightness change rates.

As shown in the following Table 1 and FIGS. 6 and 7, the decrease of retroreflection coefficients is small even at a high entrance angle and moreover, the change of retroreflection coefficients is small for a change of rotation angles in the case of the retroreflective sheetings of Embodiments 1 to 4 of the present invention while the brightness is extremely deteriorated at an entrance angle of 15° in the case of the retroreflective sheeting prepared for Comparative Example 1 and the brightness is extremely deteriorated at a rotation angle of 90° in the case of the reflective sheeting prepared for the Comparative Example 2.

TABLE 1

| | Measurement condition 1 | Measurement condition 2 | Measurement condition 3 |
|---|---|---|---|
| Rotation angle | 0° | 0° | 90° |
| Observation angle | 0.2° | 0.2 | 0.2° |
| Entrance angle | 5° | 30° | 5° |
| Embodiment 1 | 1434 | 645 | 1045 |
| Embodiment 2 | 1365 | 734 | 1085 |
| Embodiment 3 | 1230 | 612 | 1118 |
| Embodiment 4 | 1204 | 682 | 1124 |
| Comparative Example 1 | 1683 | 392 | 1156 |
| Comparative Example 2 | 1139 | 724 | 348 |

The present invention is a triangular-pyramidal cube-corner retroreflective element characterized in that triangular-pyramidal cube-corner retroreflective elements protruding on a common bottom plane ($S_x$–$S_x'$) share a base edge (x) on the bottom plane ($S_x$–$S_x'$) and are arranged on the bottom plane ($S_x$–$S_x'$) so as to be faced each other, the bottom plane ($S_x$–$S_x'$) is a common plane including may base edges (x,x, . . . ) shared by the triangular-pyramidal reflective elements, the two triangular-pyramidal reflective elements faced each other include the shared base edges (x,x, . . . ) on the bottom plane ($S_x$–$S_x'$) and form a pair of substantially-same-shape elements faced each other so as to be substantially symmetric to planes ($L_x$—$L_x$, $L_x$—$L_x$, . . . ) vertical to the bottom plane ($S_x$–$S_x'$), and the optical axis of the triangular-pyramidal reflective elements tilts so that the angle formed between the optical axis and the vertical line becomes 0.5 to 1.5° in the direction in which the difference (q–p) between the distance (q) from the intersection (Q) of the optical axis and the bottom plate ($S_x$–$S_x'$) up to the base edges (x,x, . . . ) shared by the element pair and the distance (p) from the intersection (P) of a vertical line extended from the apex of the element pair to the bottom plane ($S_x$–$S_x'$) up to the base edges (x,x, . . . ) shared by the element pair becomes plus (+) or minus (−).

Thereby, a retroreflective sheeting of the present invention is not only superior in high-brightness characteristic which is a basic optical characteristic generally requested for a triangular-pyramidal reflective element, that is, reflectivity represented by the reflectivity of the light incoming from the front of the triangular-pyramidal reflective element but also the entrance angularity and rotation angularity are greatly improved.

What is claimed is:

1. A triangular-pyramidal cube-corner retroreflective element characterized in that triangular-pyramidal cube-corner retroreflective elements protruded onto a common bottom plane ($S_x$–$S_x'$) share a base edge (x) on the bottom plane and are arranged on the bottom plane ($S_x$–$S_x'$) in the closest-packed state so as to be faced each other, the bottom plane ($S_x$–$S_x'$) is a common plane including many base edges (x,x, . . . ) shared by the triangular-pyramidal reflective elements, two faced triangular-pyramidal reflective elements include the shared base edges (x,x, . . . ) on the bottom plane ($S_x$–$S_x'$) and form a pair of substantially-same-shaped elements faced each other so as to be substantially symmetric to planes ($L_x$—$L_x$, $L_x$—$L_x$, . . . ) vertical to the bottom plane ($S_x$–$S_x'$), and the optical axis of the triangular-pyramidal reflective element pair tilts so that the angle formed between the optical axis and a vertical line extended from apexes ($H_1$ and $H_2$) of the elements to the bottom plane ($S_x$–$S_x'$) ranges between 0.5° and 1.5° in the direction in which the difference (q–p) between the distance (q) from the intersection (Q) of the optical axis and the bottom plane ($S_x$–$S_x'$) up to the base edges (x,x, . . . ) shared by the elements and the distance (p) from the intersection (P) of the vertical line and the bottom plane ($S_x$–$S_x'$) up to the base edges (x,x, . . . ) shared by the element pair becomes plus (+) or minus (−).

2. The triangular-pyramidal cube-corner retroreflective element according to claim 1, characterized in that the optical axis via apexes ($H_1$ and $H_2$) of the triangular-pyramidal reflective elements tilts by 0.6° to 1.4° from a vertical line extended from the apexes ($H_1$ and $H_2$) of the above triangular-pyramidal reflective elements to the bottom plane ($S_x$–$S_x'$) in the direction for (q–p) to become plus (+) or minus (−).

3. The triangular-pyramidal cube-corner retroreflective element according to any one of claims 1 and 2, characterized in that the optical axis of the triangular-pyramidal reflective elements tilts by 0.6° to 1.4° in the direction in which the difference (q–p) between the distance (q) from the intersection (Q) of the optical axis and the bottom plane ($S_x$–$S_x'$) up to the base edges (x,x, . . . ) shared by the elements and the distance (p) from the intersection (P) of a vertical line extended from apexes ($H_1$ and $H_2$) of the elements to the bottom plane ($S_x$–$S_x'$) and the bottom plane ($S_x$–$S_x'$) up to the base edges (x,x, . . . ) shared by the elements becomes plus (+).

4. The triangular-pyramidal cube-corner retroreflective element according to claim 3, characterized in that $h_x$ is substantially larger than $h_y$, and $h_z$ when assuming the height from a bottom plane ($S_x$–$S_x'$) including base edges (x,x, . . . ) shared by two triangular-pyramidal reflective elements faced each other up to apexes ($H_1$ and $H_2$) of the triangular-pyramidal reflective elements as $h_x$, the height from a bottom plane ($S_y$–$S_y'$) including the other base edges (y,y, . . . ) of the triangular-pyramidal reflective elements up to apexes ($H_1$ and $H_2$) of the triangular-pyramidal reflective elements as $h_y$, and the height from a bottom plane ($S_z$–$S_z'$) including the still other base edges (z,z, . . . ) of the triangular-pyramidal reflective elements up to apexes ($H_1$ and $H_2$) of the triangular-pyramidal reflective elements as $h_z$.

5. The triangular-pyramidal cube-corner retroreflective element according to claim 4, characterized in that $h_y$ and $h_z$ are substantially equal to each other and $h_x$ is substantially larger than $h_y$ and $h_z$ when assuming the height from a bottom plane ($S_x$–$S_x'$) including base edges (x,x, . . . ) shared by two triangular-pyramidal reflective elements faced each other up to apexes ($H_1$ and $H_2$) of the triangular-pyramidal reflective elements as $h_x$, the height from a bottom plane ($S_y$–$S_y'$) including the other base edges (y,y, . . . ) of the triangular-pyramidal reflective elements up to apexes ($H_1$ and $H_2$) of the triangular-pyramidal reflective elements as $h_y$, and the height from a bottom plane ($S_z$–$S_z'$) including the still other base edges (z,z, . . . ) of the triangular-pyramidal reflective elements up to apexes ($H_1$ and $H_2$) of the triangular-pyramidal reflective elements as $h_z$.

6. The triangular-pyramidal cube-corner retroreflective element according to either of claims 1 and 2, characterized in that the optical axis of the triangular-pyramidal reflective elements tilts in the direction in which the difference (q–p) between the distance (q) from the intersection (Q) of the optical axis and the bottom plane ($S_x$–$S_x'$) up to the base edges (x,x, . . . ) shared by the element pair and the distance (p) from the intersection (P) of a vertical line extended from apexes ($H_1$ and $H_2$) of the elements to the bottom plane ($S_x$–$S_x'$) and the bottom plane ($S_x$–$S_x'$) up to the base edges (x,x, . . . ) shared by the elements becomes minus (−) and moreover, $h_y$ and $h_z$ are substantially equal to each other and $h_x$ is substantially smaller than $h_y$ and $h_z$ when assuming the height from a bottom plane ($S_x$–$S_x'$) including base edges (x,x, . . . ) shared by two triangular-pyramidal reflective elements faced each other up to apexes ($H_1$ and $H_2$) of the triangular-pyramidal reflective elements as $h_x$, the height from a bottom plane ($S_y$–$S_y'$) including the other base edges (y,y, . . . ) of the triangular-pyramidal reflective elements up to apexes ($H_1$ and $H_2$) of the triangular-pyramidal reflective elements as $h_y$, and the height from a bottom plane ($S_z$–$S_z'$) including the still other base edges (z,z, . . . ) of the triangular-pyramidal reflective elements up to apexes ($H_1$ and $H_2$) of the triangular-pyramidal reflective elements as $h_z$.

7. The triangular-pyramidal cube-corner retroreflective element according to claim 5, characterized in that $1.03 < h_{max}/h_{min} < 1.3$ is satisfied when at least two of $h_x$, $h_y$, and $h_z$ are substantially different from each other and the maximum of $h_x$, $h_y$, and $h_z$ is $h_{max}$ and the minimum is assumes as $h_{min}$.

8. The triangular-pyramidal cube-corner retroreflective element according to claim 7, characterized in that $h_x$, $h_y$, and $h_z$ respectively range between 50 and 500 $\mu$m.

9. The triangular-pyramidal cube-corner retroreflective element according to claim 8, characterized in that $h_x$, $h_y$, and $h_z$ respectively range between 60 and 200 μm.

10. The triangular-pyramidal cube-corner retroreflective element according to claim 7, characterized in that at least one prism-face angle formed when three lateral faces (faces $a_1$, $b_1$, and $c_1$) or (faces $a_2$, $b_2$, and $c_2$) of the triangular-pyramidal cube-corner retroreflective element cross each other ranges between 89.5° and 90.5° and is slightly deviated from 90.000°.

11. The triangular-pyramidal cube-corner retroreflective element according to claim 7, characterized in that the above two triangular-pyramidal cube-corner retroreflective elements faced each other are arranged in the closest-packed state and formed like a sheet while sharing base edges (x,x, . . . ).

* * * * *

UNITED STATES PATENT AND TRADEMARK OFFICE
CERTIFICATE OF CORRECTION

PATENT NO. : 6,802,616 B2
DATED : October 12, 2004
INVENTOR(S) : Ikuo Mimura

It is certified that error appears in the above-identified patent and that said Letters Patent is hereby corrected as shown below:

Column 1,
Line 63, "trouble" should read -- problem --; and
Line 67, "the trouble" should read -- problem --.

Column 3,
Line 64, "can not" should read -- cannot --.

Column 4,
Line 25, "faced" should read -- facing --.

Column 9,
Line 45, "hoax" should read -- $h_{max}$ --.

Column 10,
Line 51, "same" should read -- the same --.

Column 12,
Line 16, "these" should be deleted;
Line 45, "trouble" should read -- problem --; and
Line 64, "simply" should read -- simplify --.

Column 13,
Line 67, "theses" should read -- these --.

Column 14,
Line 5, "ununiformly" should read -- non-uniformly -- and "trouble" should read -- problem --; and
Line 34, "removed." should read -- being removed. --.

Column 19,
Line 34, "be faced" should read -- face --; and
Line 40, "faced" should read -- facing --.

Column 20,
Line 11, "faced" should read -- facing --;
Line 25, "faced" should read -- facing --; and
Line 64, "assumes" should read -- assumed --.

UNITED STATES PATENT AND TRADEMARK OFFICE
CERTIFICATE OF CORRECTION

PATENT NO. : 6,802,616 B2
DATED : October 12, 2004
INVENTOR(S) : Ikuo Mimura

It is certified that error appears in the above-identified patent and that said Letters Patent is hereby corrected as shown below:

Column 22,
Line 4, "faced" should read -- facing --.

Signed and Sealed this

Twenty-ninth Day of March, 2005

JON W. DUDAS
*Director of the United States Patent and Trademark Office*